3 Sheets—Sheet 1.
J. ASHWORTH.
WIRE-BRUSH MACHINES.
No. 195,075. Patented Sept. 11, 1877.
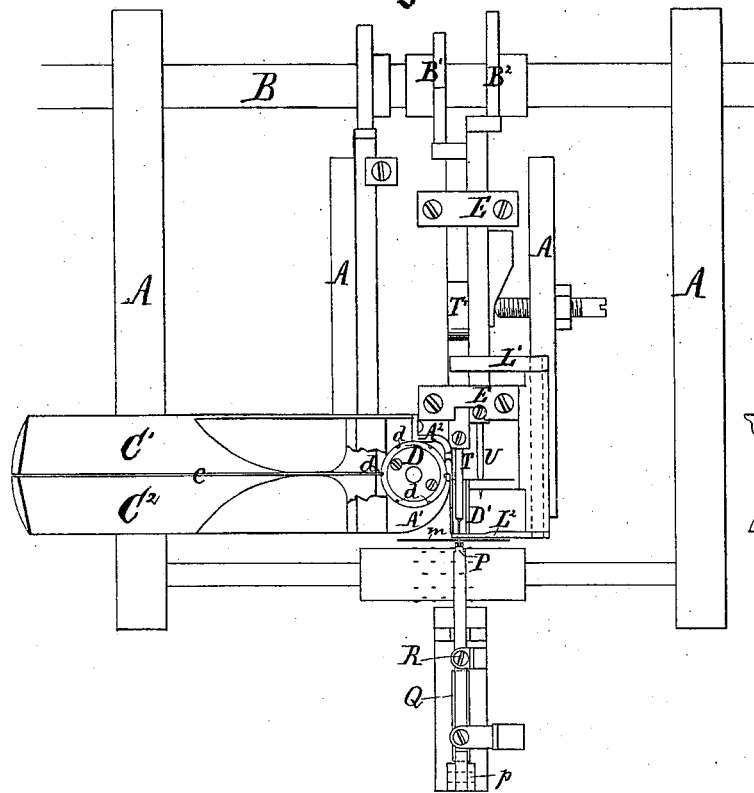
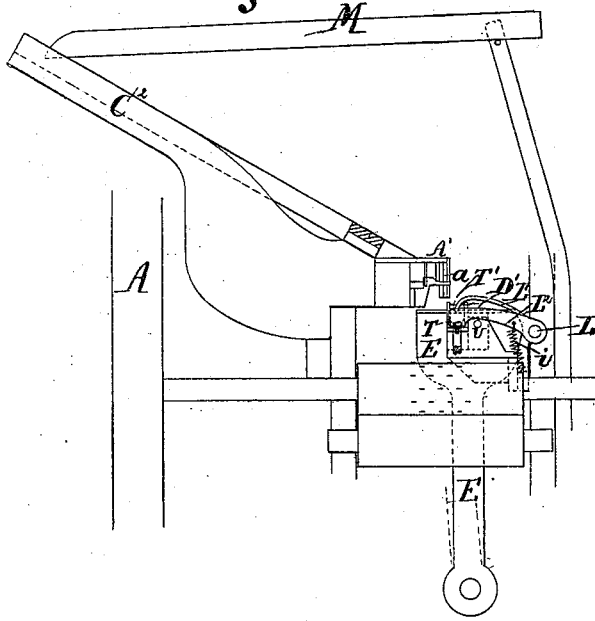
Witnesses:
M. A. Bayless
A. Henry Gentino
Inventor:
John Ashworth
by his attorney
J. L. Stetson
New York.

J. ASHWORTH.
WIRE-BRUSH MACHINES.
No. 195,075. Patented Sept. 11, 1877.
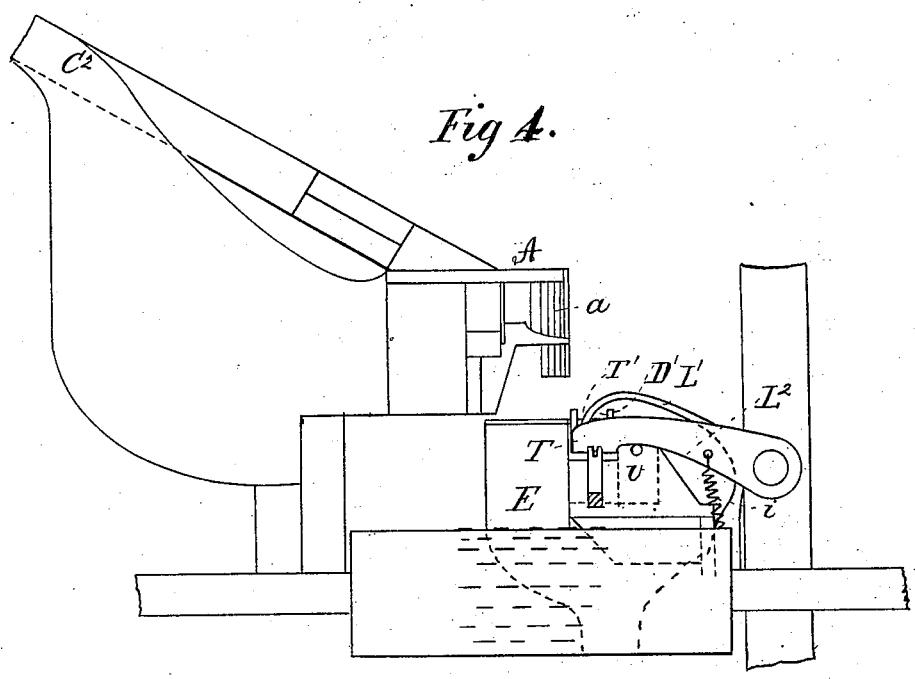

J. ASHWORTH.
WIRE-BRUSH MACHINES.
No. 195,075. Patented Sept. 11, 1877.
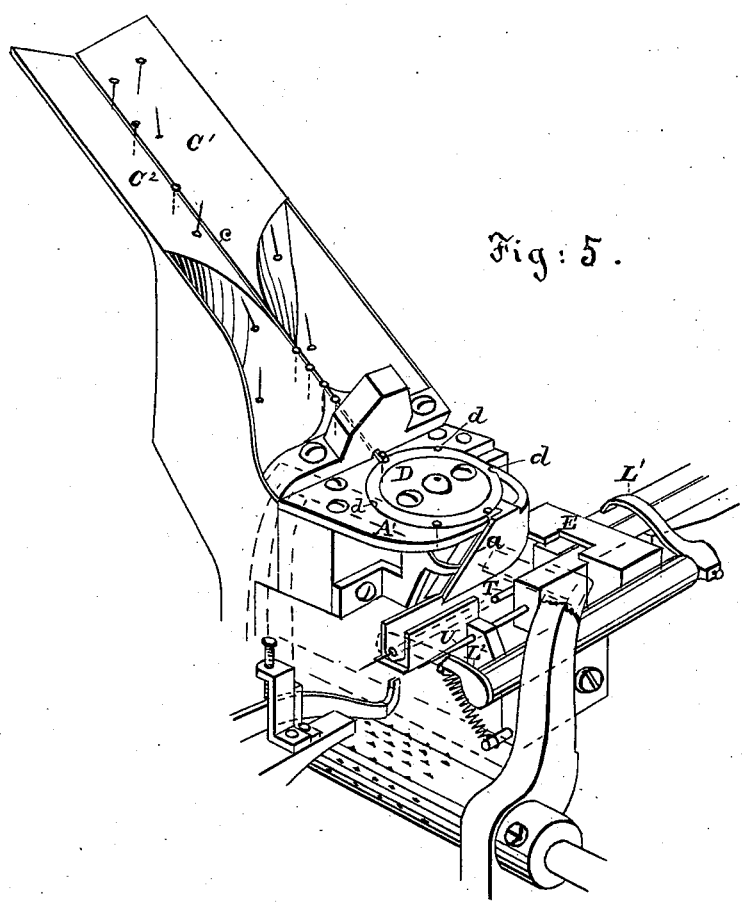
Fig: 5.

UNITED STATES PATENT OFFICE.

JOHN ASHWORTH, OF SOMERVILLE, ASSIGNOR TO BENJAMIN POLAND, OF ARLINGTON, MASSACHUSETTS.

IMPROVEMENT IN WIRE-BRUSH MACHINES.

Specification forming part of Letters Patent No. 195,075, dated September 11, 1877; application filed January 16, 1877.

*To all whom it may concern:*

Be it known that I, JOHN ASHWORTH, of Somerville, Middlesex county, in the State of Massachusetts, have invented certain new and useful Improvements relating to Machines for Manufacturing Wire Brushes, of which the following is a specification:

The British patent to Walton, of 1857, No. 1,212, describes a machine for setting cardteeth in single lengths, having a head formed on each; but the teeth were formed in the same machine, and simultaneously with the setting of the same in the rubber or flexible material forming the back.

The machine described in the patent to my brother, Robert Ashworth, dated November 21, 1876, No. 184,494, describes a machine in which the short lengths of wire are also cut off and headed in the same machine, with provisions for moving the backing material backward and forward to different extents to form the oval or approximately pear-shaped outline which seems to be required for a hair-brush.

I use in my machine some devices described in my brother's patent for irregularly moving the backing material. I set the wire in a manner corresponding to his and to Walton's; but I have devised important improvements over those or anything previously known to me.

I use pins properly manufactured and headed beforehand. There are marked advantages in this mode of operation. Any cause which involves a necessity for stopping the manufacturing of the pins need not stop the setting, and, likewise, a stoppage of the setting does not stop the manufacturing. One part of the work may, under some circumstances, be carried on much more rapidly than the other.

In the carrying out of the invention I have introduced modifications of the mechanism which are improvements in devices, but which may not be absolutely necessary to the success of what I esteem my main feature—the division of the operations.

The following is a description of what I consider the best means of carrying out this invention.

The accompanying drawings form a part of this specification.

Figure 1 is a plan view with some of the top work removed. Fig. 2 is a front view with some of the front work removed. Fig. 3 is a side elevation, showing some of the feeding parts with a portion of the movable trough, which forms an important element in the machine. Fig. 4 is an enlarged view of certain parts of Fig. 2. Fig. 5 is a perspective view of the horizontal wheel and the adjacent parts.

Similar letters of reference indicate corresponding parts in all the figures.

A is the fixed frame-work; B, the main shaft, driven by a belt from a steam-engine or other suitable motive power, and provided with cams and other means for imparting the requisite motion.

To avoid unnecessary complication I will omit many of the parts which are shown in the patent to my brother, above referred to, as also many of the parts which communicate the motions, believing that the novel features will be more clearly seen without them.

M is a pan or hopper, which may, if desired, be much larger than is here shown, and may contain a large quantity of pins, by which I mean short lengths of straight wire of the proper size, properly cut off and headed, ready to be fed into place and set in the backing material by the mechanism now to be described.

The pins move down slowly with the slight tremulous motion of the hopper M, which may be increased, if desired, by machinery for imparting slight jars or concussions, and drop therefrom into the crack $c$ between the stout inclined sides $C^1$ $C^2$. They slide down by gravity, and form a continuous row, side by side, hanging by their heads, those which chance to come in a wrong position being conveyed away by the side passages, as will be understood.

D is a horizontal wheel mounted on an upright shaft, and revolving, step by step, by the action of a swinging lever and click below. In the periphery of the wheel D are notches $d$, each of a size sufficient to receive one pin, and one only. The step-by-step rotation of the wheel D $d$ allows each of the notches $d$, in succession, to stand a considerable time adjacent to the lower end of the crack $c$. As the notch moves away therefrom it is certain to carry one, and only one, of the pins, which is retained in the notch by the presence of a closely fitting semi-ring, $A^1$. A half-rotation of the wheel D carries the pin from the receiving-point to the delivery-point. During the latter part of this semi-revolution it brings the pin in contact with an inclined groove, $a$, in a portion of the framing $A^2$. As the wheel stops at the termination of one of its step-by-step movements, the pin lying fairly in this incline having now passed the end of the retaining semicircle $A^1$, it is free to slide down in this incline, which it does.

E is what I term a "carriage," having a swinging or vibrating motion on a center below. It carries an awl, U, and a pusher, T, which are guided therein, and are provided with striking-plates at their back ends of sufficient width to allow for the traverse of the carriage, and be always in contact with their respective operating-cams $B^1$ $B^2$ on the main shaft B. A cam-piece, T', is adjusted on the pusher T by screws, as shown. The front end of the cam-piece T' is beveled.

D' is a trough, of V-section, carried on the carriage E, along the bottom of which the end of the pusher T operates.

At the period when each pin is liberated and slides down the groove $a$ the V-section trough D' is directly below it, and receives it.

After the carriage is moved into that position the cam $B^2$ performs its function, and drives the awl forward and pricks a hole in the backing material $m$. It enters and is withdrawn while the carriage is stationary. Then the carriage, with one pin in place in its trough D', is vibrated to the other extreme of its motion, which is just sufficient to bring the point of the pin lying in the trough D' in the line previously occupied by the awl. Now the cam $B^1$ performs its function, and drives the pusher T forward. The pusher T acts against the head of the pin lying in the trough D', and thrusts the pin into the hole previously made by the awl.

It is important to guide the pin very accurately and reliably. The bottom of the trough D' is continued a little farther than the sides, with only a slight groove in the front extension to aid in guiding.

$L^2$ is a lever fixed on a shaft, L. It is drawn down with the force of a gentle spring, $i$, and presses on the extension at the front of the trough D'. Another arm, $L^1$, is fixed on the same shaft. When the pusher T moves forward, this arm $L^1$ is struck by the front end of the cam-piece T', thereby turning the shaft L and lifting the presser $L^2$. These parts are so proportioned that the presser $L^2$ shall bear down until the head of the pin and the front end of the pusher are nearly in contact therewith, and then shall be suddenly lifted.

I provide a movable abutment at the front of the backing material, with a deep notch, in which the awl and the pin are successively received. Before the backing material is moved to the right or the left after each pin is set, the abutment is pressed down so as to set the pin free. P is the movable abutment. It has a lever turning on a center, $p$, and pressed upward by a spring, Q. A set-screw, R, restrains its vertical motion, suitable guides being provided to hold it in position laterally, and a swinging lever, operated at the proper moment, effects the depression by means of an adjustable screw acting on an inclined surface on the lever, as represented.

I have in my experiments used a guiding-piece to receive the point of the pin when it comes around, hanging between the wheel D and the inclosing-piece $A^1$, and guide it into the inclined groove $a$. I esteem such a guide useful, but not absolutely essential.

It is important that the trough D' move; otherwise the awl U could not serve mounted at a little distance therefrom, as shown. The motion of the carriage E being just equal to the distance apart of the center-line of the trough D' and the awl U, the awl and the trough occupy successively the same place, and both may be guided quite up to the face of the backing material. Without this provision it would seem impossible to prick the goods from the back side, (by which I mean the same side from which the wires are to be inserted,) and have the trough extend quite up to the face of the backing material.

It is not essential that the trough D' or the other parts of the carriage move in a curved line. They may slide, if preferred. Nor is it important that their motion be exactly lateral. The parts may reciprocate downward and upward, or in various oblique directions, so long as there is a motion sufficient to compensate for the distance apart of the trough with its pusher and the awl.

The motion of the trough may, if desired in any case, be made backward and forward, or to and from the backing material. Such a motion, without any lifting or lowering, or motion laterally or obliquely, would accommodate the awl, which might come up from below, or move laterally into the space between it and the backing material, to thus prick the hole and then retreat. In such case the motion would allow the awl to perform its functions, and yet, when the pin is thrust forward into the material, the moving trough would be close up to the backing material, and would guide the pin with the increased exactness due to that fact.

I claim as my improvement in machines for manufacturing wire brushes and analogous goods—

1. A selecting or separating device, in combination with the trough D′, awl U, and pusher T, as specified.

2. The moving trough D′ and pusher T, in combination with the awl U and backing material m, as specified.

3. The moving trough D′ and pusher T, with their several operating means, as shown, in combination with each other and with a feeding device, awl, and suitable means for holding the backing material m, as herein specified.

4. In combination with the hopper M and inclined slides $C^1 C^2$, the step-by-step wheel D, with its notches d, confining-piece $A^1$, inclined groove a, and moving trough D′, as and for the purposes herein specified.

5. In combination with the trough D′ and pusher T, the presser $L^2$, spring i, and lifting means $L^1$ T′, adapted to serve as and for the purposes herein specified.

In testimony whereof I have hereunto set my hand this 13th day of January, 1877, in the presence of two subscribing witnesses.

JOHN ASHWORTH.

Witnesses:
T. L. WAKEFIELD,
T. H. WAKEFIELD.